US012670796B2

(12) United States Patent
Ambos et al.

(10) Patent No.: US 12,670,796 B2
(45) Date of Patent: Jun. 30, 2026

(54) SYSTEMS AND METHODS FOR PROVIDING INFORMATION WITHIN AN AIRCRAFT COMMUNICATIONS ADDRESSING AND REPORTING SYSTEM (ACARS) MESSAGE TO A COMMUNICATION DEVICE

(71) Applicant: THE BOEING COMPANY, Arlington, VA (US)

(72) Inventors: Alyssa Ambos, Austin, TX (US); Jeffrey Lee Williams, Littleton, CO (US)

(73) Assignee: The Boeing Company, Arlington, VA (US)

( * ) Notice: Subject to any disclaimer, the term of this patent is extended or adjusted under 35 U.S.C. 154(b) by 155 days.

(21) Appl. No.: 18/627,505

(22) Filed: Apr. 5, 2024

(65) Prior Publication Data

US 2025/0316174 A1     Oct. 9, 2025

(51) Int. Cl.
| | |
|---|---|
| G08G 5/21 | (2025.01) |
| G06K 7/14 | (2006.01) |
| G08G 5/26 | (2025.01) |

(52) U.S. Cl.
CPC ............. G08G 5/21 (2025.01); G06K 7/1417 (2013.01); G08G 5/26 (2025.01)

(58) Field of Classification Search
None
See application file for complete search history.

(56) References Cited

U.S. PATENT DOCUMENTS

| | | | |
|---|---|---|---|
| 8,892,273 B1 * | 11/2014 | Raghu .................... | B64D 43/00 701/3 |
| 2006/0080451 A1 * | 4/2006 | Eckert .................... | H04L 69/06 709/230 |
| 2018/0115623 A1 * | 4/2018 | Gheorghe ............. | H04W 48/04 |
| 2019/0304209 A1 * | 10/2019 | Huynh ................. | G07C 5/0816 |
| 2023/0010103 A1 * | 1/2023 | Baladhandapani ...... | G08G 5/00 |
| 2025/0316176 A1 * | 10/2025 | Askarpour ............. | B64D 47/08 |

* cited by examiner

*Primary Examiner* — Madison R. Inserra
(74) *Attorney, Agent, or Firm* — Joseph M. Butscher; Carroll, Hoette & Butscher, LLC

(57)     ABSTRACT

A system and a method include a communication device including a display, and a control unit in communication with the communication device. The control unit is configured to receive an Aircraft Communications Addressing and Reporting System (ACARS) message in a first format. The first format includes aviation information. The control unit is further configured to change the aviation information in the first format into a second format that is electronically viewable on the display. The second format differs from the first format. The control unit is further configured to show the aviation information in the second format on the display. An aircraft is operated based on the aviation information.

19 Claims, 3 Drawing Sheets

Receive ACARS message
in first format          ⟋200

Change information within
the ACARS message into a          ⟋202
second format that differs
from the first format Show the information in the          ⟋204
second format on a display
of a communication device

SYSTEMS AND METHODS FOR PROVIDING INFORMATION WITHIN AN AIRCRAFT COMMUNICATIONS ADDRESSING AND REPORTING SYSTEM (ACARS) MESSAGE TO A COMMUNICATION DEVICE

FIELD OF THE DISCLOSURE

Examples of the present disclosure generally relate to systems and methods for providing information within an aircraft communications addressing and reporting system (ACARS) message to a communication device.

BACKGROUND OF THE DISCLOSURE

Aircraft are used to transport passengers and cargo between various locations. Numerous aircraft depart from and arrive at a typical airport every day.

Various types of aviation information can be sent to pilots through Aircraft Communications Addressing and Reporting System (ACARS) messages. ACARS is a digital datalink system which transmits short messages between aircraft and ground stations, such as through radio signals or satellites.

A flight deck of an aircraft can receive updated weather and routing information through ACARS messages. An ACARS message is printed on paper, or displayed on an avionics system within the flight deck. Typically, a pilot interprets the ACARS message, then manually transcribes the information within the ACARS message into geospatial objects in mapping applications.

As can be appreciated, typing geospatial information, such as latitude and longitude information, from a piece of paper into another application is time consuming, and can be prone to human error.

SUMMARY OF THE DISCLOSURE

A need exists for a system and a method for efficiently and effectively providing information from an ACARS message to a communication device, such as a handheld mobile device.

With that need in mind, certain examples of the present disclosure provide a system including a communication device including a display, and a control unit in communication with the communication device. The control unit is configured to: receive an Aircraft Communications Addressing and Reporting System (ACARS) message in a first format, wherein the first format includes aviation information; change the aviation information in the first format into a second format that is electronically viewable on the display, wherein the second format differs from the first format; and show the aviation information in the second format on the display, wherein an aircraft is operated based on the aviation information.

In at least one example, the system also includes a database including aviation terms. The control unit is configured to change the aviation information in the first format into the second format by translating the aviation information in the first format based on the aviation terms.

In at least one example, the control unit is configured to change the aviation information in the first format into the second format by converting the aviation information in the first format into one or more quick response (QR) codes including the aviation information.

In at least one example, the control unit is separate, distinct, and remote from the aircraft. In at least one other example, the control unit is onboard the aircraft.

In at least one example, the communication device is within a flight deck or cockpit of the aircraft.

In at least one example, the communication device further includes an imaging device. The imaging device is configured to acquire an image of the ACARS message in the first format. The control unit is configured to receive the image of the ACARS message in the first format from the communication device.

The aviation information in the second format can include encoded operational data configured to restrict operation of the communication device.

The aviation information in the second format can include encoded operational information configured to automatically control one or more controls of the aircraft.

The control unit can be an artificial intelligence or machine learning system.

Certain examples of the present disclosure provide a method including receiving, by the control unit, the ACARS message in the first format; changing, by the control unit, the aviation information in the first format into the second format; and showing the aviation information in the second format on the display. An aircraft is operated based on the aviation information.

Certain examples of the present disclosure provide an aircraft including an internal cabin. The communication device can be within the internal cabin. The control unit can be within the internal cabin.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
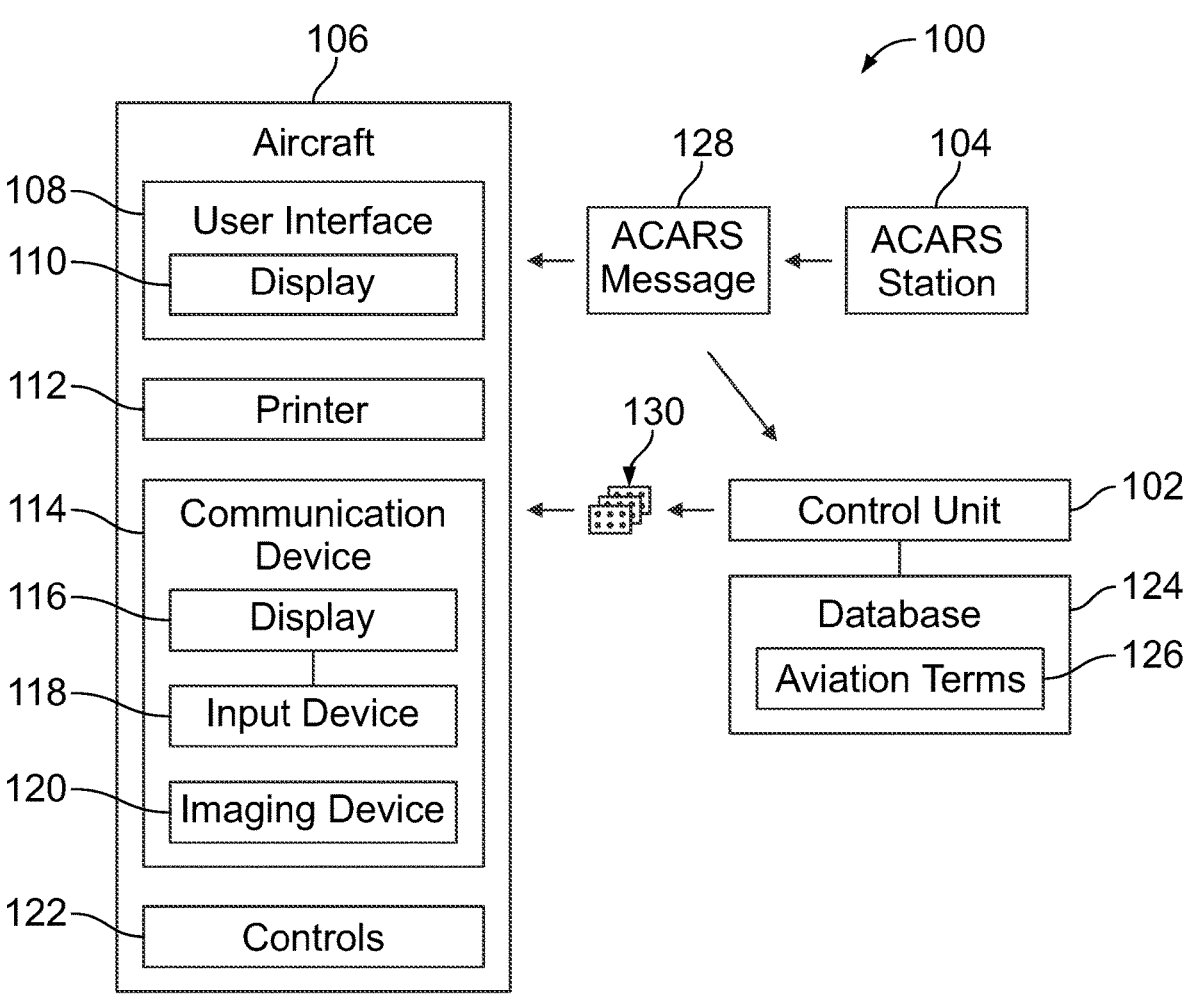
FIG. 1 illustrates a block diagram of a system, according to an example of the present disclosure.

FIG. 1 illustrates a block diagram of a system 100, according to an example of the present disclosure. The system 100 includes a control unit 102 in communication with one or both of an Aircraft Communications Addressing and Reporting System (ACARS) station 104 and an aircraft 106. For example, the control unit 102 can include one or more antennas, transceivers, or the like in communication with antennas, transceivers, or the like of the ACARS station 104 and the aircraft 106. In at least one example, the control unit 102 is separate, distinct, and remote from the ACARS station 104 and the aircraft 106. For example, the control unit 102 can be at a ground-based monitoring location that is remote from the ACARS station 104. As another example, the control unit 102 can be co-located with the ACARS station 104. As another example, the control unit 102 can be onboard the aircraft 106, such as part of a computer within a flight deck or cockpit of the aircraft 106.

The aircraft 106 includes a user interface 108, which includes a display 110. The user interface 108 can be part of a computer within the flight deck or cockpit of the aircraft 106. The display 110 is an electronic device configured to electronically show images, videos, text, and/or the like. For example, the display 110 is configured to electronically show an ACARS message thereon. The display 110 can be a monitor, screen, television, touchscreen, and/or the like.

The aircraft 106 also includes a printer 112, which is configured to print various messages, such as on paper. The printer 112 can also be within the flight deck or cockpit of the aircraft 106. The printer 112 is configured to print an ACARS message on paper.

The aircraft 106 also includes a communication device 114, such as within the flight deck or cockpit of the aircraft 106. The communication device 114 is different, separate, and distinct form the user interface 108. In at least one example the communication device 114 is a handheld communication device, such as a smart phone or tablet. As another example, the communication device 114 can be part of a computer within the flight deck or cockpit. As another example, the communication device 114 can be remote from the aircraft, such as at a central monitoring location, air traffic control, a flight dispatcher, an airline operations center.

The communication device 114 includes a display 116 in communication with an input device 118 and an imaging device 120, such as through one or more wired or wireless connections. The display 116 is an electronic device configured to electronically show images, videos, text, and/or the like. The display 116 can be a monitor, screen, television, touchscreen, and/or the like. The input device 118 can include a keyboard, mouse, stylus, touchscreen interface (that is, the input device 118 can be integral with the display 116), and/or the like. In at least one example, the imaging device 120 is a camera, which is configured to acquire images, such as still images and/or video. As another example, the imaging device 120 can be a scanner, such an infrared or laser scanner.

The aircraft 106 also includes controls 122 configured to allow an operator, such as the pilots, to control operation of the aircraft 106. For example, the controls 122 include one or more of a control handle, yoke, joystick, control surface controls, accelerators, decelerators, and/or the like.

In at least one example, the control unit 102 is in communication with a database 124, which stores aviation terms 126 commonly found in ACARS messages. For example, the aviation terms 126 include translated messages from ACARS messages regarding latitude, longitude, distance, altitude, aeronautical fixes such as waypoints, and the like. In at least one example, the aviation terms 126 stored in the database 124 include unique encodings for meteorological and aeronautical messages that allow complex geometries and both standard and non-standard syntax to be accurately decoded and transformed into geospatial data, such as latitude and longitude data.

In operation, the ACARS station 104 outputs an ACARS message 128 to the aircraft 106. The ACARS message 128 can be shown on the display 110 of the user interface 108 and/or printed on paper by the printer 112. The communication device 114 is then used to acquire an image of the ACARS message 128, whether shown on the display 110 or printed on paper by the printer 112. The ACARS message 128 is in a first format, such as an ACARS format.

In response to acquiring the image of the ACARS message 128, the communication device 114 outputs the image of the ACARS message 128 to the control unit 102. The control unit 102 compares the information within the ACARS message, as acquired by the imaging device 120 of the communication device 114, with the aviation terms 126 stored in the database 124. Based on the comparison, the control unit 102 translates the ACARS message 128 into an electronic message in a second format that differs from the first format of the ACARS message 128. In this manner, the control unit 102 translates the ACARS message 128 into a different, reformatted electronic message, which is then output to the communication device 114. In at least one example, the reformatted electronic message is a translated message. That is, the control unit 102 translates the ACARS message in the first format into the second format, which is an electronic, digital message. The reformatted electronic message is then shown on the display 116 of the communication device 114. A user can then view the reformatted electronic message on the display 116, and forward to other communication devices, such as through operation of the input device 118. In this manner, the user can quickly and readily view information within the ACARS message 128, and forward to other communication devices, without an individual manually transcribing the ACARS message 128 into a different format.

As another example, instead of translating the ACARS message 128 into a different format using the stored aviation terms 126 within the database 124, the control unit 102 receives the ACARS message 128 from the ACARS station 104. The control unit 102 then converts the ACARS message 128 from the first format (for example, the ACARS format) into a second format, such as one or more quick response (QR) codes 130. The control unit 102 then outputs the QR code(s) 130 to the user interface 108 and/or the communication device 114. In at least one example, the imaging device 120 of the communication device 114 can scan the QR code(s) 130, which can be shown on the display 110. The QR code(s) 130 include the information within the ACARS message 128. The control unit 102 or another control unit (such as that of the communication device 114) can then show the information within the QR code(s) 130 on the display 116. In at least one example, the communication device 114 can receive the QR code(s) 130 and automatically provide the information stored therein without the need for the imaging device 120 to scan the QR code(s) 130. In this example, the system 100 may not require the database 124. Instead, the system 100 may not include the database 124.

In this example, the control unit 102 converts the ACARS message 128 into a different, reformatted electronic message, such as the QR code(s) 130, which is then output to the communication device 114. That is, the control unit 102 converts the ACARS message 128 in the first format into the second format, such as the QR code(s) 130. Information within the QR code(s) 130 is then shown on the display 116 of the communication device 114. A user can then view the reformatted electronic message on the display 116, and forward to other communication devices, such as through operation of the input device 118. In this manner, the user can quickly and readily view information within the ACARS message 128, and forward to other communication devices, without an individual manually transcribing the ACARS message 128 into a different format.

As described herein, the control unit 102 receives an ACARS message 128, such as from an acquired image of the ACARS message 128, as received from the communication device 114, or directly from the ACARS station 104. The ACARS message 128 is in a first format, such as an ACARS format. In response to receiving the ACARS message 128, the control unit 102 reformats the ACARS message 128 into a different, second format. For example, the control unit 102 can use the aviation terms 126 within the database 124 to translate the ACARS message 128 into a different, electronic format, which is shown on the display 116. As another example, the control unit 102 can convert the ACARS message 128 into a QR code 130. The information within the QR code 130 is then shown on the display 116. In at least one example, the information within the reformatted message shown on the display 116 includes geospatial information, such as latitude and longitude.

As described herein, the control unit 102 automatically parses automated information within the ACARS message 128, such as into geospatial representations, using optical character recognition (OCR). The control unit 102 can identify standard message formatting, such as stored in the database 124, and/or American Standard Code for Information Interchange (ASCII)-generated quick response (QR) codes. A pilot scans the ACARS message 128, such as can be printed on paper by the printer 112, and/or shown on the display 110, with the imaging device 120 of the communication device 114. The control unit 102 automatically interprets geospatial objects within the ACARS message 128, such as significant meteorological hazards (SIGMETs), route changes, and other areas using latitude and longitude vertices.

In at least one example, the control unit 102 encodes operational data into the QR code(s) 130. The operational data can include information that restricts operation of the communication device 114. For example, the operational data can include geospatial data, which is used to match tracked geospatial data of the communication device 114 to allow for operation of the communication device 114. For example, if the encoded geospatial data within the QR code 130 does not match the tracked geospatial data of the communication device 114, the communication device 114 may be locked, and inoperable. In this manner, the control unit 102 can restrict operation of the communication device 114.

As another example of restricting operation of the communication device 114, the encoded data within the QR code 130 can include information that allows for particular operation of the communication device 114. As an example, the encoded data can provide a pass key for certain functions of the communication device 114, such as communication with other communication devices to allow forwarding of the QR codes 130, an ability of the imaging device 120 to scan the QR code(s) 130, operation of the input device 118 of the communication device 114, and/or the like.

In at least one example, information within a reformatted message (whether translated by the control unit 102 based on the aviation terms 126 within the database 124, or converted into the QR code(s) 130) can be used to operate the aircraft 106. For example, the aircraft 106 is operated according to the reformatted message, such as to avoid hazardous weather, fly at a particular altitude and airspeed, and/or the like.

In at least one example, the control unit 102 can automatically control the aircraft 106, such as through automatic operation of one or more of the controls 122 of the aircraft 106, through information encoded within the reformatted message(s). For example, the communication device 114 can be in communication with a flight computer of the aircraft 106. The communication device 114 can forward the reformatted message, which can include encoded operational information, to the flight computer, which can then automatically control operation of the aircraft 106, such as through automatic operation of one or more of the controls, according to the encoded operational information within the reformatted message.

As described herein, the system 100 includes the communication device 114 including the display 116. The control unit 102 is in communication with the communication device 114. The control unit 102 is configured to receive an ACARS message 128 in a first format (such as an ACARS format). The first format includes aviation information, such as geospatial information (such as latitude and longitude data), weather information, altitude, airspeed, and/or the like. The control unit 102 is further configured to change the aviation information in the first format into a second format that is electronically viewable on the display 116. The second format differs from the first format. That is, the second format is not the first format. The control unit 102 is further configured to show the aviation information in the second format on the display 116. The aircraft 106 is operated based on the aviation information. For example, controls 122 of the aircraft 106 are operated to control an airspeed, altitude, position, and the like of the aircraft 106 to conform to, abide with, or the like with the aviation information in the second format. As an example, the controls 122 can be operated, either manually or automatically, to avoid hazardous weather noted within the aviation information. As another example, the controls 122 can be operated, either manually or automatically, to ascend or descend to a different altitude to avoid locations of air turbulence noted in the aviation information.

In at least one example, the database 124 includes the aviation terms 126. The control unit 102 is configured to change the aviation information in the first format into the second format by translating the aviation information in the first format based on the aviation terms 126.

In at least one example, the control unit 102 is configured to change the aviation information in the first format into the second format by converting the aviation information in the first format into one or more quick response (QR) codes 130 including the aviation information.

In at least one example, the control unit 102 is configured to change the aviation information in the first format into the second format by translating the aviation information in the first format based on the aviation terms, and converting the aviation information in the first format into the QR code(s) 130.

Figure 2:
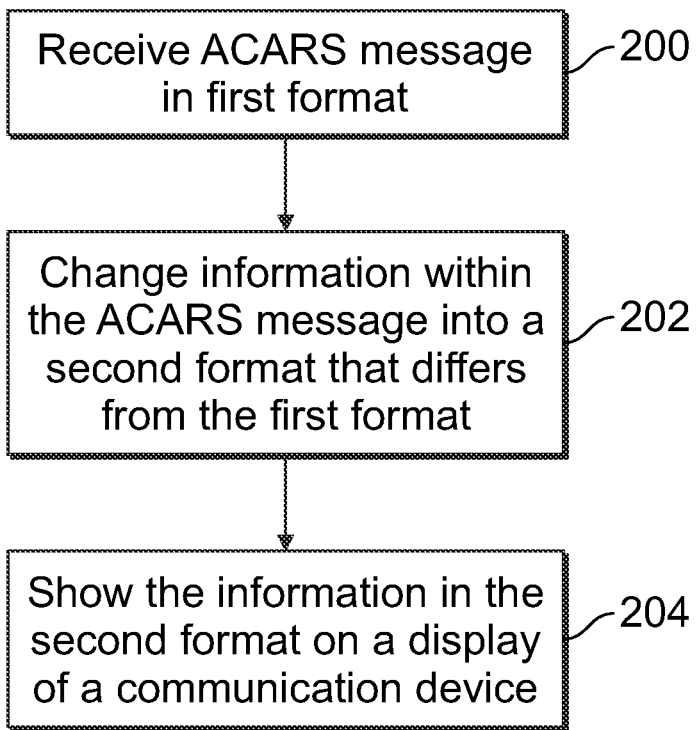
FIG. 2 illustrates a flow chart of a method, according to an example of the present disclosure.

FIG. 2 illustrates a flow chart of a method, according to an example of the present disclosure. Referring to FIGS. 1 and 2, at 200, the control unit 102 receives an ACARS message 128, which is in a first format (such as an ACARS format). For example, the control unit 102 can receive an image of the ACARS message 128, such as acquired by the imaging device 120, from the communication device 114, and/or directly receive the ACARS message 128 from the ACARS station 104.

At 202, the control unit 102 changes information within the ACARS message 128 into a second format that differs from the first format. The second format is an electronic, digital format, such as can be shown on the display 116, and forwarded from the communication device 114 to other communication devices. In at least one example, the control unit 102 changes the ACARS message 128 to the second format by translating the ACARS message 128 according to aviation terms 126 stored in the database 124. In at least one other example, the control unit 102 changes the ACARS message to the second format by converting the ACARS message 128 into a QR code 130.

At 204, the control unit 102 outputs the information in the second format to the communication device 114, which then shows the information in the second format on the display 116. The information in the second format can then be electronically transferred (such as forwarded) to other electronic devices (such as other communication devices), through operation of the input device 118.

Figure 3:
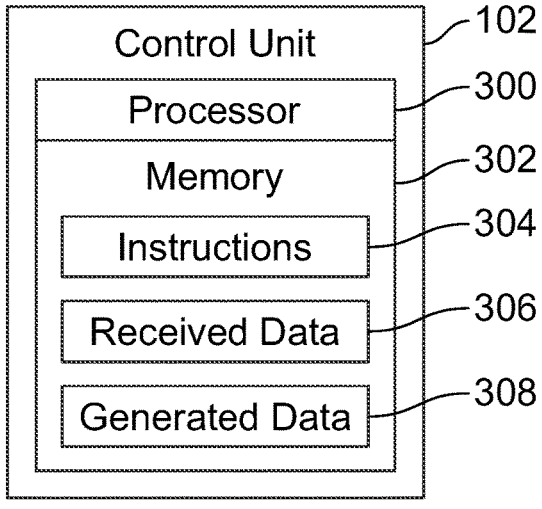
FIG. 3 illustrates a schematic block diagram of a control unit, according to an example of the present disclosure.

FIG. 3 illustrates a schematic block diagram of the control unit 102, according to an example of the present disclosure. In at least one example, the control unit 102 includes at least one processor 300 in communication with a memory 302. The memory 302 stores instructions 304, received data 306, and generated data 308. The control unit 102 shown in FIG. 3 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 102 may be or include one or more processors that are configured to control operation, as described herein.

The control unit 102 is configured to execute a set of instructions that are stored in one or more data storage units or elements (such as one or more memories), in order to process data. For example, the control unit 102 may include or be coupled to one or more memories. The data storage units may also store data or other information as desired or needed. The data storage units may be in the form of an information source or a physical memory element within a processing machine.

The set of instructions may include various commands that instruct the control unit 102 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 102 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-3, examples of the subject disclosure provide systems and methods that allow large amounts of data to be quickly and efficiently analyzed by a computing device. For example, the control unit 102 can receive and analyze ACARS messages sent to numerous aircraft 106 from numerous ACARS stations 104. As such, large amounts of data, which may not be readily discernable by human beings, are being tracked and analyzed. The vast amounts of data are efficiently organized and/or analyzed by the control unit 102, as described herein. The control unit 102 analyzes the data in a relatively short time in order to quickly and efficiently change the ACARS messages 128 into readily viewable electronic digital messages, which can be forwarded to various electronic devices. As such, examples of the present disclosure provide increased and efficient functionality, and vastly superior performance in relation to a human being reviewing the vast amounts of data.

In at least one example, components of the system 100, such as the control unit 102, provide and/or enable a computer system to operate as a special computer system for reformatting ACARS messages 128. The control unit 102 improves upon standard computing devices by determining such information and automatically communicating with individuals (such as operators of aircraft, ground support crew, flight attendants, and the like) in an efficient and effective manner.

In at least one example, the control unit 102 uses machine learning algorithms which automatically change the ACARS messages 128, such as through automatic translation or automatic conversion into QR codes 130. In at least one example, all or part of the systems and methods described herein are or otherwise include an artificial intelligence (AI) or machine-learning system that can automatically perform the operations of the methods also described herein. In at least one example, the control unit 102 can be or otherwise include a deterministic or rules based evaluation system. In at least one example, the control unit 102 can be an artificial intelligence or machine learning system. These types of systems may be trained from outside information and/or self-trained to repeatedly improve the accuracy with how data is analyzed to determine and present the relevant information to users. For example, an AI control unit 102 can be trained to learn information strings, terms, and the like within ACARS messages 128, and automatically change the information into a different format. Over time, these systems can improve by determining and communicating with increasing accuracy and speed, thereby significantly reducing the likelihood of any potential errors. For example, the AI or machine-learning systems can learn and determine models, associate such models with received data, and determine potential conflicts. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determinations and communications described herein. The training minimizes conflicts and interference by performing an iterative training algorithm, in which the systems are retrained with an updated set of data, and based on the feedback examined prior to the most recent training of the systems. This provides a robust analysis model that can better change the ACARS format and present reformatted, electronic digital information which is readily viewable on displays of communications devices.

Figure 4:
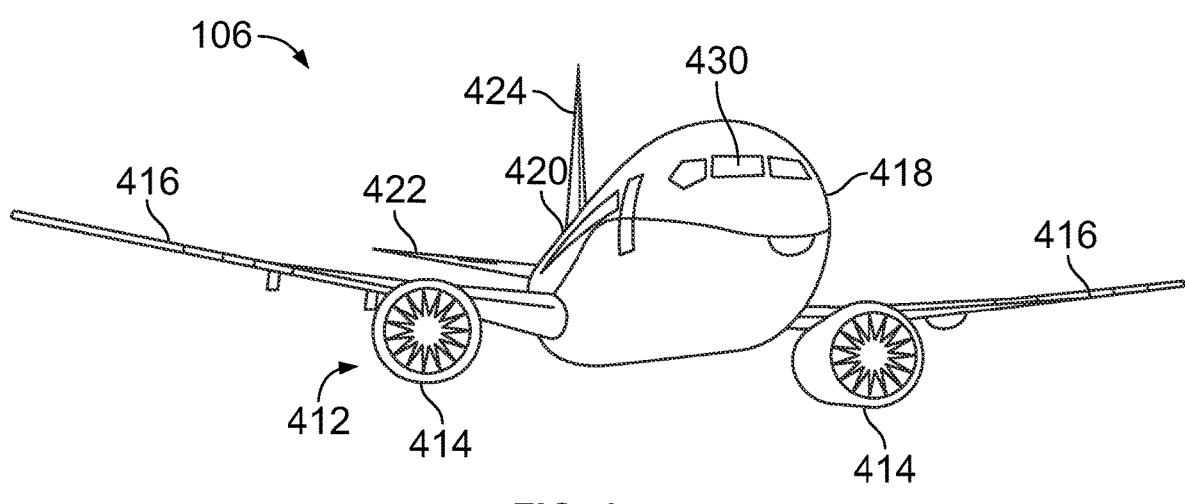
FIG. 4 illustrates a perspective front view of an aircraft, according to an example of the present disclosure.

FIG. 4 illustrates a perspective front view of an aircraft 106, according to an example of the present disclosure. The aircraft 106 includes a propulsion system 412 that includes engines 414, for example. Optionally, the propulsion system 412 may include more engines 414 than shown. The engines 414 are carried by wings 416 of the aircraft 106. In other examples, the engines 414 may be carried by a fuselage 418 and/or an empennage 420. The empennage 420 may also support horizontal stabilizers 422 and a vertical stabilizer 424. The fuselage 418 of the aircraft 106 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 4 shows an example of an aircraft 106. It is to be understood that the aircraft 106 can be sized, shaped, and configured differently than shown in FIG. 4.

Further, the disclosure comprises examples according to the following clauses:

Clause 1. A system comprising:
a communication device including a display; and
a control unit in communication with the communication device,
wherein the control unit is configured to:
receive an Aircraft Communications Addressing and Reporting System (ACARS) message in a first format, wherein the first format includes aviation information,
change the aviation information in the first format into a second format that is electronically viewable on the display, wherein the second format differs from the first format, and
show the aviation information in the second format on the display, wherein an aircraft is operated based on the aviation information.

Clause 2. The system of Clause 1, further comprising a database including aviation terms, wherein the control unit is configured to change the aviation information in the first format into the second format by translating the aviation information in the first format based on the aviation terms.

Clause 3. The system of Clauses 1 or 2, wherein the control unit is configured to change the aviation information in the first format into the second format by converting the aviation information in the first format into one or more quick response (QR) codes including the aviation information.

Clause 4. The system of any of Clauses 1-3, wherein the control unit is separate, distinct, and remote from the aircraft.

Clause 5. The system of any of Clauses 1-3, wherein the control unit is onboard the aircraft.

Clause 6. The system of any of Clauses 1-5, wherein the communication device is within a flight deck or cockpit of the aircraft.

Clause 7. The system of any of Clauses 1-6, wherein the communication device further comprises an imaging device, wherein the imaging device is configured to acquire an image of the ACARS message in the first format, and wherein the control unit is configured to receive the image of the ACARS message in the first format from the communication device.

Clause 8. The system of any of Clauses 1-7, wherein the aviation information in the second format includes encoded operational data configured to restrict operation of the communication device.

Clause 9. The system of any of Clauses 1-8, wherein the aviation information in the second format includes encoded operational information configured to automatically control one or more controls of the aircraft.

Clause 10. The system of any of Clauses 1-9, wherein the control unit is an artificial intelligence or machine learning system.

Clause 11. A method for a system comprising:
a communication device including a display; and
a control unit in communication with the communication device,
wherein the control unit is configured to:
receive an Aircraft Communications Addressing and Reporting System (ACARS) message in a first format, wherein the first format includes aviation information,
change the aviation information in the first format into a second format that is electronically viewable on the display, wherein the second format differs from the first format, and
show the aviation information in the second format on the display, wherein the method comprises:
receiving, by the control unit, the ACARS message in the first format;
changing, by the control unit, the aviation information in the first format into the second format; and
showing the aviation information in the second format on the display, wherein an aircraft is operated based on the aviation information.

Clause 12. The method of Clause 11, wherein said changing comprises translating the aviation information in the first format based on the aviation terms.

Clause 13. The method of Clauses 11 or 12, wherein said changing comprises converting the aviation information in the first format into one or more quick response (QR) codes including the aviation information.

Clause 14. The method of any of Clauses 11-13, further comprising:

acquiring, by an imaging device of the communication device, an image of the ACARS message in the first format; and receiving, by the control unit, the image of the ACARS message in the first format from the communication device.

Clause 15. The method of any of Clauses 11-14, further comprising restricting operation of the communication device according to encoded operational data within the aviation information.

Clause 16. The method of any of Clauses 11-15, further comprising automatically controlling one or more controls of the aircraft based on encoded operational data within the aviation information.

Clause 17. The method of any of Clauses 11-16, wherein the control unit is an artificial intelligence or machine learning system.

Clause 18. An aircraft comprising:

an internal cabin;

a communication device including a display, wherein the communication device is within the internal cabin; and a control unit in communication with the communication device, wherein the control unit is within the internal cabin, wherein the control unit is configured to:

receive an Aircraft Communications Addressing and Reporting System (ACARS) message in a first format, wherein the first format includes aviation information, change the aviation information in the first format into a second format that is electronically viewable on the display, wherein the second format differs from the first format, and show the aviation information in the second format on the display, wherein an aircraft is operated based on the aviation information.

Clause 19. The aircraft of Clause 18, further comprising a database including aviation terms, wherein the control unit is configured to change the aviation information in the first format into the second format by translating the aviation information in the first format based on the aviation terms.

Clause 20. The aircraft of Clauses 18 or 19, wherein the control unit is configured to change the aviation information in the first format into the second format by converting the aviation information in the first format into one or more quick response (QR) codes including the aviation information.

As described herein, examples of the present disclosure provide systems and methods for efficiently and effectively providing information from an ACARS message to a communication device, such as a handheld mobile device.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a communication device including a display; and a control unit in communication with the communication device, wherein the control unit is configured to:

receive an Aircraft Communications Addressing and Reporting System (ACARS) message in a first format, wherein the first format includes aviation information, change the aviation information in the first format into a second format that is electronically viewable on the display, wherein the second format differs from the first format, wherein the aviation information in the second format includes encoded operational data configured to restrict operation of the communication device, wherein the encoded operational data includes geospatial data used to match tracked geospatial data of the communication device, and wherein the control unit is configured to change the aviation information in the first format into the second format by converting the aviation information in the first format into one or more quick response (QR) codes including the aviation information, and show the aviation information in the second format on the display.

2. The system of claim 1, further comprising a database including aviation terms, wherein the control unit is configured to change the aviation information in the first format into the second format by translating the aviation information in the first format based on the aviation terms.

3. The system of claim 1, wherein the control unit is separate, distinct, and remote from the aircraft.

4. The system of claim 1, wherein the control unit is onboard the aircraft.

5. The system of claim 1, wherein the communication device is within a flight deck or cockpit of the aircraft.

6. The system of claim 1, wherein the communication device further comprises an imaging device, wherein the imaging device is configured to acquire an image of the ACARS message in the first format, and wherein the control unit is configured to receive the image of the ACARS message in the first format from the communication device.

7. The system of claim 1, wherein the aviation information in the second format includes encoded operational information configured to automatically control one or more controls of the aircraft.

8. The system of claim 1, wherein the control unit is an artificial intelligence or machine learning system.

9. The system of claim 1, wherein the control unit is further configured to lock the communication device to render the communication device inoperable in response to the geospatial data not matching the tracked geospatial data of the communication device.

10. The system of claim 1, wherein the aviation terms include encodings for meteorological and aeronautical messages that allow geometries and syntax to be accurately decoded and transformed.

11. A method for a system comprising:
a communication device including a display; and
a control unit in communication with the communication device,
wherein the control unit is configured to:
  receive an Aircraft Communications Addressing and Reporting System (ACARS) message in a first format, wherein the first format includes aviation information,
  change the aviation information in the first format into a second format that is electronically viewable on the display, wherein the second format differs from the first format, and
  show the aviation information in the second format on the display,
wherein the method comprises:
receiving, by the control unit, the ACARS message in the first format;
changing, by the control unit, the aviation information in the first format into the second format, wherein said changing comprises converting the aviation information in the first format into one or more quick response (QR) codes including the aviation information;
restricting operation of the communication device according to encoded operational data within the aviation information, wherein the encoded operational data includes geospatial data used to match tracked geospatial data of the communication device; and showing the aviation information in the second format on the display.

12. The method of claim 11, wherein said changing comprises translating the aviation information in the first format based on the aviation terms.

13. The method of claim 12, wherein the aviation terms include encodings for meteorological and aeronautical messages that allow geometries and syntax to be accurately decoded and transformed.

14. The method of claim 11, further comprising:
acquiring, by an imaging device of the communication device, an image of the ACARS message in the first format; and
receiving, by the control unit, the image of the ACARS message in the first format from the communication device.

15. The method of claim 11, further comprising automatically controlling one or more controls of the aircraft based on encoded operational data within the aviation information.

16. The method of claim 11, wherein the control unit is an artificial intelligence or machine learning system.

17. The method of claim 11, wherein said restricting the operation comprises locking the communication device to render the communication device inoperable in response to the geospatial data not matching the tracked geospatial data of the communication device.

18. An aircraft comprising:
an internal cabin;
a communication device including a display, wherein the communication device is within the internal cabin; and
a control unit in communication with the communication device, wherein the control unit is within the internal cabin, wherein the control unit is configured to:
  receive an Aircraft Communications Addressing and Reporting System (ACARS) message in a first format, wherein the first format includes aviation information,
  change the aviation information in the first format into a second format that is electronically viewable on the display, wherein the second format differs from the first format, wherein the aviation information in the second format includes encoded operational data configured to restrict operation of the communication device, wherein the encoded operational data includes geospatial data used to match tracked geospatial data of the communication device, and wherein the control unit is configured to change the aviation information in the first format into the second format by converting the aviation information in the first format into one or more quick response (QR) codes including the aviation information, and
  show the aviation information in the second format on the display.

19. The aircraft of claim 18, further comprising a database including aviation terms, wherein the control unit is configured to change the aviation information in the first format into the second format by translating the aviation information in the first format based on the aviation terms.

* * * * *